A. J. PAHL.
METHOD OF LAYING SUBMARINE POWER AND OTHER ELECTRIC CABLES.
APPLICATION FILED JAN. 29, 1913.

1,060,785.

Patented May 6, 1913.

WITNESSES:
H. A. Stock.
S. Constine.

INVENTOR
August Julius Pahl
BY
Wm. F. Booth
ATTORNEY

UNITED STATES PATENT OFFICE.

AUGUST JULIUS PAHL, OF ALAMEDA, CALIFORNIA.

METHOD OF LAYING SUBMARINE POWER AND OTHER ELECTRIC CABLES.

1,060,785. Specification of Letters Patent. Patented May 6, 1913.

Application filed January 29, 1913. Serial No. 744,906.

*To all whom it may concern:*

Be it known that I, AUGUST JULIUS PAHL, a citizen of the United States, residing at Alameda, in the county of Alameda and State of California, have invented certain new and useful Improvements in Methods of Laying Submarine Power and other Electric Cables, of which the following is a specification.

My invention relates to the art of laying electric cables under water, and it consists in the novel method which I shall now fully describe.

In a predetermined course, a steel messenger cable is first laid in the ordinary manner of paying it off from a reel on a barge. In order to perfect the lay of the messenger cable, both for exactness of position, and for the required amount of slack, said cable after being initially laid is then under-run by the barge and pulled to exact position and slack taken up or put in to get the proper tension on said cable so that it will subsequently, when the power cable is being served or wired to it, pay off the barge at the proper angle. This preliminary under-running of the messenger cable may be done once or more times as may be found expedient and necessary. When the messenger cable is thus laid and fully adjusted, it is again under-run by the barge, whose direction is thus accurately defined and whose progress may be controlled by a gripping and releasing action; and during this last under-running the power cable which is on the barge is reeled off and served, that is, wired, to the messenger cable, and the two thus connected pay out over the stern of the barge, the serving and paying out going on continuously over the course, except where stops are made for tests, examinations, more careful or elaborate serving, splicing or jointing of the power cable, and for any other purposes.

As additional aid to the full understanding of the method, reference is made to the accompanying drawings in which—

Figure 1:
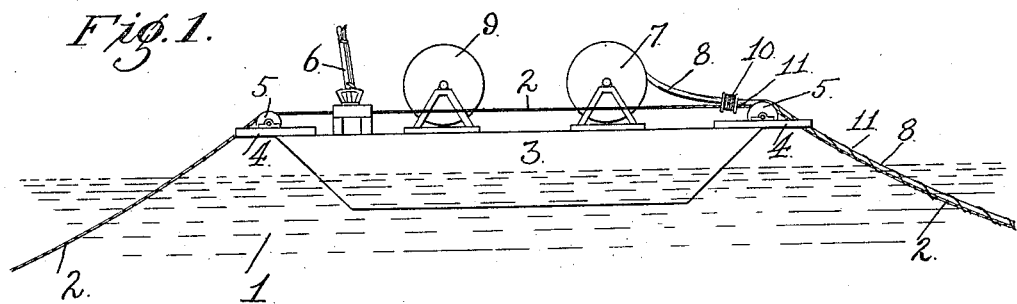
Figure 2:
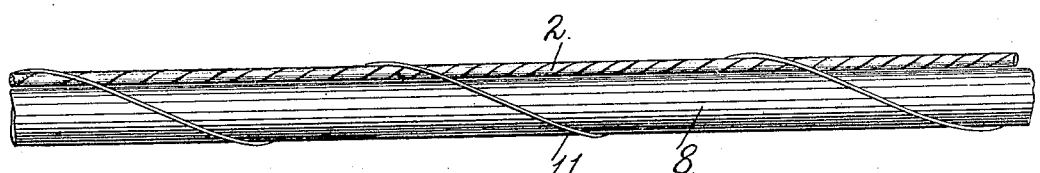
Figure 3:
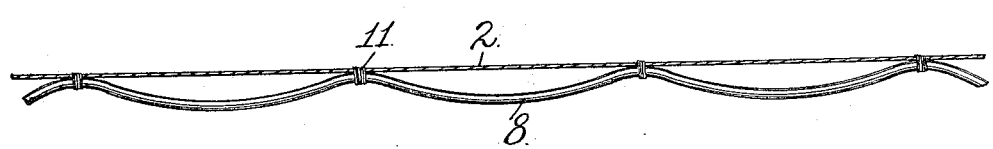

Figure 1 is a view of a section of a waterbody, showing the messenger-cable, the barge under-running said cable, the controlling grip, the power-cable reels, the power cable, the service of the two cables and their joint paying out over the stern. Fig. 2 is a fragmentary view showing a continuous or extended wiring or serving of the power cable to the messenger-cable. Fig. 3 is a similar view showing separated service with intervening sagging portions of the power cable.

In Fig. 1— 1 is a water-body in which the messenger cable 2 has been laid in a predetermined course. It may be assumed that the messenger cable has been already under-run by the barge, pulled to position and such slack taken from it or put into it as will give it the required tension in paying out when the power cable is served to it.

3 is a barge. It may travel under its own power or it may be towed. The barge is fitted at each end with guides 4 and sheave-wheels 5, and said barge under-runs the messenger cable 2, as shown, said cable passing up over the guide and wheel at one end, extending the length of the barge and paying out again over the wheel and guide at the stern.

6 is a grip on the barge, engaging the messenger cable. This grip may be of any suitable character. I have found in practice that a cable-railway grip serves the purpose excellently. On the barge is a reel 7 carrying the power cable 8. This reel is, in practice, the ordinary comparatively small factory-reel with its original cable burden. The advantage of this I shall presently mention, but in this connection I may here point out that I have on the barge a number of these factory reels each with its original cable. For the sake of illustration, therefore, I show a second reel 9. When the power cable from the first reel 7 is near its end, the cable from the reel 9 is properly joined to the end of the first cable and the operation of laying proceeds. Thus also with the power cables of a third and of succeeding reels.

10 indicates a wire coil the wire from which is used to serve or tie the power cable 8 to the messenger cable 2, as shown at 11, and the two cables thus united pay out over the stern of the barge. The grip 6 enables the barge to stop at any place desired. The barge starts from one shore end and the power cable is served to the messenger cable just before it goes over the stern sheave. The tension on the power cable can be adjusted at will by allowing it to hang in sections of any length as shown in Fig. 3. In this way much or little slack can be put in the power cable depending on the condition of the marine bottom at the point of laying. In some places it may be necessary to allow quite a section of power cable to be paid off without serving to the messenger cable, in order that the power cable may adjust itself to any rocky or unequal condition of the bottom and thus prevent undue strain on said power cable at points of support, which strain is likely to happen if the power cable is laid tight and spans deep depressions in the bottom.

At points where the power cable is likely to be picked up by the anchors of vessels, said cable is served tightly continuously to the messenger cable, as shown in Fig. 2. So, too, at the joints of the power cable, the service is tight on both sides, to prevent strain on said joints. The strain is thus put on the messenger cable so that there is no possibility of straining the power cable at the joints and cause a break in the lead sheath, as frequently happens.

In case of bad weather the end of one reel of power cable can be fastened to the messenger cable and let down to the bottom; whereupon the barge can continue to the shore to await better weather. Then by under-running the messenger cable, this end can be picked up again and the work continued when weather conditions permit. This prevents damage to the cable in bad weather.

Another advantage of my method is that the power cable is only handled once, that is from the original factory reels direct to the water. This is a very decided advantage in that reeling up a great weight of cable on a large reel causes strain to be put on the cable due to the weight of the entire cable being supported on the inner turns. There is also the tendency for the cable on a large reel to travel relative to the reel due to its slight difference in diameter between the inner turns and the reel. This becomes a serious problem when several miles of heavy cable is laid and it may be sufficient to cause damage to parts of the cable. Another advantage of my method is the maintaining of an absolute course. This is quite an item, as the saving of power cable, due to the course being maintained, may amount to considerable. Another advantage is the absolute control which can be kept over the equipment. The power cable can be paid off loose or tight and can be stopped at any position for inspection and test. It can be let off a few inches at a time, and any bad places can easily be detected. In my method the power cable being of comparatively short length on the small factory reels, provides for easy and frequent tests, for as each reel is laid it can be tested. The testing of long power cables while being laid is impractical as handling of high voltage through slip rings on a barge is not feasible.

I claim:—

1. The method of laying submarine power and other electric cables which consists in laying in a predetermined course a messenger cable; under-running said messenger cable with a barge; and during said under-running serving the power cable to the messenger cable and paying the connected cables out over the stern of the barge.

2. The method of laying submarine power and other electric cables which consists in laying in a predetermined course a messenger cable; under-running said messenger cable with a barge; controllably connecting said barge with the messenger cable; and during said under-running serving the power cable to the messenger cable and paying the connected cables out over the stern of the barge.

3. The method of laying submarine power and other electric cables which consists in laying in a predetermined course a messenger cable; under-running said messenger cable with a barge and accurately adjusting the position and slack of said cable during said under-running; again under-running said messenger cable with said barge; and during said last named under-running serving the power cable to the messenger cable and paying the connected cables out over the stern of the barge.

4. The method of laying submarine power and other electric cables which consists in laying in a predetermined course a messenger cable; under-running said messenger cable with a barge and accurately adjusting the position and slack of said cable during said under-running; again under-running said messenger cable with said barge, and controllably connecting the barge with the cable; and during said last named under-running serving the power cable to the messenger cable and paying the connected cables out over the stern of the barge.

In testimony whereof I have signed my name to this specification in the presence of two subscribing witnesses.

AUGUST JULIUS PAHL.

Witnesses:
WM. F. BOOTH,
D. B. RICHARDS.

---

Copies of this patent may be obtained for five cents each, by addressing the "Commissioner of Patents, Washington, D. C."